United States Patent Office 2,969,400
Patented Jan. 24, 1961

2,969,400
PREPARATION OF TRIS(VINOXY)PROPANE

Clayton M. Huggett, Newtown, and John J. Nedwick, Philadelphia, Pa., assignors to Rohm & Haas Company, Philadelphia, Pa., a corporation of Delaware No Drawing. Filed Sept. 12, 1958, Ser. No. 760,578

5 Claims. (Cl. 260—615)

This invention deals with a process for preparing tris-(vinoxy)propane.

It has been reported that when glycerol was heated in the presence of potassium hydroxide with acetylene at 10–12 atmospheres pressure at temperatures of 170° to 190° C., vinyl ethers were formed. Reppe reports formation also of a cyclic product. When we attempted to repeat the methods of the art, there were obtained 2-methyl - 4 - vinoxymethyl - 1,3 - dioxolane, 2 - methyl - 4-hydroxymethyl-1,3-dioxolane, and glyceryl monovinyl ether, and when butanol was used as a solvent, there was then had a minor proportion (11%) of tris(vinoxy) propane.

After careful fractionation of this last material, a portion gave an analysis corresponding to the correct ultimate analysis and having the following properties: B.P., 178° C./760 mm., 100° C./32 mm., and 71° C./7 mm.; $d_4^{25}$, 0.9648; refractive index, $n_D^{20}$, 1.4543; hydrolyzable aldehyde, 17.25 meq. per gram (theory, 17.64 meq. per gram). From these data it would appear that the product previously reported as tris(vinoxy)propane was not this substance but rather 2-methyl-4-vinoxymethyl-1,3-dioxolane.

A method has now been found which provides more favorable yields of the desired tris(vinoxy)propane. It comprises dissolving acetylene under pressure in N-methylpyrrolidinone, N-ethylpyrrolidinone, or a mixture thereof, passing the resulting solution of acetylene into a heated zone under pressure sufficient to maintain the solution in liquid phase and, without desorption of acetylene, injecting into the heated solution glycerol and an alkali metal hydroxide as catalyst, allowing reaction of acetylene, and glycerol to take place in the presence of an excess of acetylene over the glycerol, and separating tris(vinoxy) propane.

For saturation of the N-alkylpyrrolidinone with acetylene the temperature of this solvent should be below 25° C. The temperature may be carried down to the freezing point of the mixture. A good temperature range is between 20° C. and —33° C. with the most convenient range between 20° and 0° C.

The pressure of acetylene will depend in part upon the temperature of the resulting solution, a range between 500 and 100 p.s.i. being useful, the relatively higher pressures being used if the temperature is in the upper part of the above ranges. In the preferred temperature range pressures of 200–300 p.s.i. are usually used; higher being, of course, permissible but not necessary.

After acetylene is dissolved in the N-alkylpyrrolidinone, the resulting solution is passed under higher pressures to maintain the liquid phase as the solution is heated. Pressures from 1500 to 5000 p.s.i. may be used with reaction temperatures of 150° C. to 250° C., preferably 180° to 220° C.

While catalyst and glycerol may be separately injected into the heated solution, it is convenient to dissolve or suspend an alkali metal hydroxide in the glycerol and inject the solution or suspension into the heated solution containing acetylene. Catalyst in a proportion of 2% to 10% of the glycerol is generally used. A solution of 5% to 8% of potassium hydroxide (based on the weight of glycerol) is preferred, but other alkali metal hydroxides or mixtures thereof may be used. There may also be used as catalyst one or more alkali metal alkoxides, such as sodium methoxide, potassium ethoxide, potassium butoxide, lithium isopropoxide, or sodium propoxide. Also, an alkali metal may be dispersed in the glycerol to be reacted.

A period of one to thirty minutes is generally sufficient to ensure reaction of acetylene and glycerol, the holding time depending upon the conditions of reaction. During the reaction it is important for best results to have present an excess of acetylene over that required to give the tris-ether. The excess may be from 3.3 moles of acetylene per mole of glycerol up to 10 or more moles of acetylene per mole of glycerol.

After reaction the mixture is passed through a relief valve, excess acetylene is taken off and recycled if desired, and products are recovered by conventional methods, including distillation. In one method of recovery of desired product the reaction mixture is diluted with one to three volumes of water. From the upper layer tris(vinoxy)propane and 2-methyl - 4 - vinoxymethyl-1,3-dioxolane are recovered. The solvent can be recovered from the lower layer. In another procedure one quarter to three quarter volume of water is added to the reaction mixture and the resulting mixture is extracted with a readily distillable hydrocarbon solvent. The tris(vinoxy)propane can be fractionated out.

The following examples illustrate how this invention may be carried out.

EXAMPLE 1

An apparatus was prepared comprising an absorber, pumps, heated coil, and relief valve leading to a chamber for separating gas and liquid. The absorber was capable of being cooled to a desired temperature and capable of withstanding pressures used for passing acetylene into solvent passing therethrough. A pump passed the resulting solution of acetylene in N-alkylpyrrolidinone from the absorber into the heated coil. Along the coil were several inlets for admitting glycerol and catalyst.

The absorber was supplied with N-methylpyrrolidinone and cooled to 7.1° C. Acetylene was pressed thereinto at 250 p.s.i.g. The solution of acetylene was pumped at 2000 p.s.i.g. through the coil which was held at 200° C. A solution of 6.3% of potassium hydroxide in glycerol was pumped into the inlets along the coil. The residence time of the mixture in the coil was 4.6 minutes. The rate of supplying N-methylpyrrolidinone was maintained at 12.5 cc. per minute and the rate of addition of the solution of potassium hydroxide in the glycerol was set at 6.6 cc. per minute, or a ratio of about 2 parts of solvent to 1 part of glycerol.

After unreacted acetylene was taken off, the reaction mixture was diluted with an equal volume of water. The upper layer which formed was taken and distilled. The conversion to 2-methyl-4-vinoxymethyl-1,3-dioxolane was 15% and the conversion to tris(vinoxy)propane was 24%. This latter compound possessed the properties detailed above.

EXAMPLES 2–8

The above procedure was followed with variations in conditions. These preparations are summarized in Table I, wherein TVOP stands for tris(vinoxy)propane. Note that in those instances where the ratio of solvent to glycerol was at least 1.5 parts of the former to 1 part of the latter the percent conversion of tris(vinoxy)propane is on the order of double the percent conversion of dioxolane, whereas when the ratio was about 1:1 there was not much difference in the amounts obtained of either product.

Table I

| Run No. | Absorber C₂H₂ (p.s.i.g.) | Absorber Temp., °C. | Reac. Temp., °C. | Feed Rates, cc./min. Solvent | Feed Rates, cc./min. Glycerol—KOH | Wt. Percent KOH | Contact Time, Mins. | Percent Conversion Dioxolane | Percent Conversion TVOP |
|---|---|---|---|---|---|---|---|---|---|
| 17-2 | 250 | 7.1 | 190 | 12.5 | 6.6 | 6.3 | 4.6 | 0 | 10.6 |
| 17-3 | 250 | 7.1 | 200 | 12.5 | 6.6 | 6.3 | 4.6 | 15 | 24.0 |
| 22-1 | 240 | 7.2 | 190 | 8.7 | 4.1 | 5.5 | 6.7 | 6.1 | 20.7 |
| 24-2 | 240 | 7.2 | 200 | 9.4 | 4.0 | 5.5 | 6.4 | 20.6 | 45.8 |
| 24-3 | 295 | 6.9 | 200 | 9.4 | 5.8 | 5.5 | 7.4 | 4.7 | 10.7 |
| 24-4 | 295 | 6.9 | 200 | 9.4 | 8.1 | 5.5 | 4.6 | 16.5 | 19.2 |
| 32-1 | 300 | 12.0 | 190 | 9.0 | 3.2 | 5.4 | 9.2 | 3.3 | 20.1 |
| 32-2 | 300 | 12.0 | 190 | 9.0 | 3.2 | 7.9 | 9.2 | 29.5 | 50.0 |
| 32-3 | 300 | 12.0 | 200 | 9.0 | 3.5 | 5.4 | 9.2 | 21.4 | 45.2 |

In place of N-methylpyrrolidinone there may similarly be used N-ethylpyrrolidinone or mixtures of the two. Replacement of these with ethers such as the dimethyl ether of ethylene glycol also leads to tris(vinoxy)propane, but in poor conversions.

Tris(vinoxy)propane is useful as a cross-linking agent in the preparation of polymers which are desired in an infusible, insoluble form. These are particularly desired for ion-exchange resins. Thus, tris(vinoxy)propane may be used at levels or 0.1% to 25% along with other vinylidene monomers to cause varying degrees of cross-linking in such systems as polymers of methyl or ethyl acrylate and, if desired, acrylic acid. In such applications tris(vinoxy)propane can replace other cross-linking agents which are regularly used or can be used in addition thereto to supplement their action.

For example, there are mixed 85 parts by weight of methyl acrylate and 15 parts of tris(vinoxy)propane. This mixture is dispersed with agitation in 150 parts of water containing 0.5 part of polyvinyl alcohol. One part of lauroyl peroxide is added. The resulting mixture is stirred and heated to 65°–70° C. for about two hours and then at 80° C. for an hour. Clear, slightly yellow beads of polymer are formed in a yield of 93%. They are filtered, washed with water, and added to 600 parts of an aqueous 10% sodium hydroxide solution. This mixture is heated under reflux for 12 hours to give a carboxylic cation exchange resin in sodium form. It can be converted to the hydrogen when washed with an aqueous acid. Tris(vinoxy)propane can be used as a controlled supplier of acetaldehyde upon acidification and also as a reducing agent under acid conditions.

We claim:

1. A process for preparing tris(vinoxy)propane which comprises dissolving acetylene under pressure in a liquid solvent consisting of at least one member of the class consisting of N-methylpyrrolidinone and N-ethylpyrrolidinone at a temperature below 25° C., heating the resulting solution of acetylene in solvent to a reacting temperature between 150° and 250° C. under a pressure sufficient to maintain the solution in liquid phase, and bringing into said solution under pressure an alkali metal catalyst and glycerol, the acetylene in said solution being in stoichiometric excess of the glycerol, and the proportion of said solvent to the glycerol being at least 1.5 parts of the former to 1 part of the latter.

2. A process for preparing tris(vinoxy)propane which comprises dissolving acetylene under pressure between 500 and 100 p.s.i. in a liquid solvent between 20° and —33° C., said solvent consisting of at least one member of the class consisting of N-methylpyrrolidinone and N-ethylpyrrolidinone, heating the resulting solution of acetylene in solvent to a reacting temperature between 180° and 220° C. under a pressure between 1500 and 5000 p.s.i. sufficient to maintain the solution in liquid phase, bringing into said solution glycerol and an alkali metal catalyst, and separating tris(vinoxy)propane, the acetylene in said solution being in stoichiometric excess of the glycerol, the said catalyst being 2% to 10% of the weight of the glycerol, and the proportion of solvent to glycerol being at least 1.5 parts of the former to 1 part of the latter.

3. A process according to claim 2 in which the alkali metal catalyst is potassium hydroxide.

4. A process for preparing tris(vinoxy)propane which comprises dissolving acetylene under pressure between 200 and 300 p.s.i. in N-methylpyrrolidinone at 0° to 20° C., heating the resulting solution of acetylene in N-methylpyrrolidinone between 180° and 220° C. under a pressure between 1500 and 5000 p.s.i. sufficient to maintain the reaction system entirely in liquid phase, introducing into said system glycerol and an alkali metal catalyst, and separating tris(vinoxy)propane, the acetylene dissolved in said N-methylpyrrolidinone being in stoichiometric excess of the glycerol, the said catalyst being 2% to 10% of the weight of the glycerol, and the proportion of the solvent to alcohol being at least 1.5 parts of the former to 1 part of the latter.

5. A process for preparing tris(vinoxy)propane which comprises dissolving acetylene under pressure between 200 and 300 p.s.i. in N-ethylpyrrolidinone at 0° to 20° C., heating the resulting solution of acetylene in N-ethylpyrrolidinone between 80° and 220° C. under a pressure between 1500 and 5000 p.s.i. sufficient to maintain the reaction system entirely in liquid phase, introducing into said system glycerol and an alkali metal catalyst, and separating tris(vinoxy)propane, the acetylene dissolved in said N-ethylpyrrolidinone being in stoichiometric excess of the glycerol, the said catalyst being 2 to 10% of the weight of the glycerol, and the proportion of solvent to glycerol being at least 1.5 parts of the former to 1 part of the latter.

References Cited in the file of this patent

FOREIGN PATENTS 855,552    Germany _____ Nov. 13, 1952

OTHER REFERENCES

Favorskii et al.: Chemical Abstracts, vol. 38 (1944), pages 330–331.

Nieuwland et al.: The Chemistry of Acetylene (1945), pp. 30–34.

Shostakovskii et al.: Chemical Abstracts, vol. 47 (1953), page 8002.